Dec. 31, 1929.  W. JACOBS  1,741,631
VARIABLE SPEED GEAR
Filed June 6, 1928
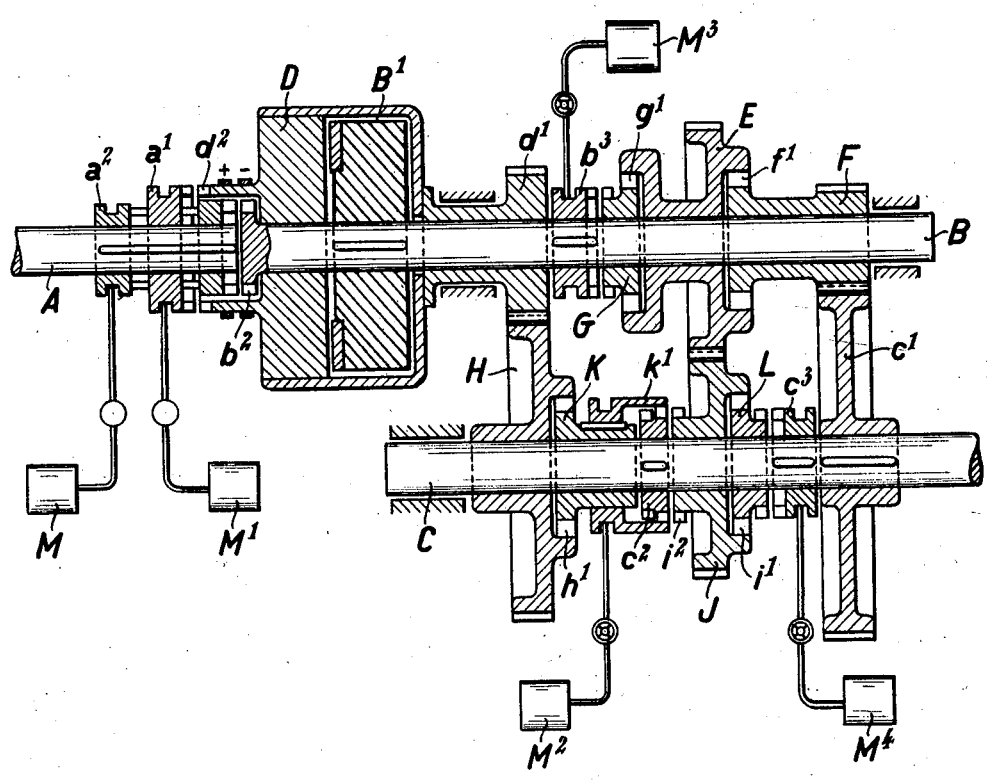
Inventor
Werner Jacobs
By Knight Bro
attys Patented Dec. 31, 1929

1,741,631

UNITED STATES PATENT OFFICE

WERNER JACOBS, OF ESSEN, GERMANY, ASSIGNOR TO FRIED. KRUPP AKTIENGESELL-SCHAFT, OF ESSEN-ON-THE-RUHR, GERMANY

VARIABLE-SPEED GEAR

Application filed June 6, 1928, Serial No. 283,367, and in Germany September 28, 1927.

The invention relates to speed change gears of the type described and claimed in my copending patent application Serial Number 223,231, filed September 30, 1927, and has for its object to improve variable speed gearing of this type in such a manner that only one slip clutch adapted to be operated at will is required to accelerate the wheels about to be thrown in, even when the gearing comprises more than two speed steps.

A preferred embodiment of the subject-matter of the invention is illustrated by way of example in longitudinal section in the drawing which accompanies and forms part of this specification, the gearing illustrated being particularly intended, like that described in the above-mentioned former patent application, to be used with Diesel locomotives.

A denotes the driving shaft of the variable speed gearing, this shaft being driven by the Diesel engine (not shown). B is an intermediate shaft arranged co-axially to shaft A, and C is the driven shaft, mounted parallel to shafts A and B of the variable speed gear that comprises four speed steps. On shaft B is rigidly fixed one half $B^1$ of the slip clutch serving as main coupling which e. g. is designed as an electro-magnetic friction coupling. Its other half D is freely rotatable on shaft B and rigidly connected on one side, through the intermediary of a cap enclosing the coupling half $B^1$, to a spur wheel $d^1$ that is likewise freely rotatable on shaft B. On the other side the coupling half D carries one half $d^2$ of a claw coupling, the other half $a^1$ of which is shiftably splined on shaft A. The latter has further shiftably splined on it a coupling half $a^2$ adapted to engage the end of shaft B which is turned toward shaft A and forms a coupling half $b^2$ corresponding to $a^2$. Shaft B has mounted on it for free rotation but not for shifting motion two spur wheels E and F which are interconnected in such a manner by a free wheel coupling $f^1$ that is adapted to come into gear automatically in one direction only, in such a manner that the wheel F can be driven by wheel E, but not wheel E by wheel F. On shaft B is further shiftably splined one half $b^3$ of a claw coupling, the other half G of which is freely rotatable on shaft B and so connected to the spur wheel E by a free wheel coupling $g^1$, that only wheel E is driven by the coupling half G, but not G by E.

The shaft C has freely mounted on it two spur wheels H and J permanently in mesh with the wheels $d^1$ and E respectively, while a spur wheel $c^1$ rigidly mounted on shaft C is permanently in mesh with wheel F. The wheels H and J are each so connected through free wheel couplings $h^1$ and $i^1$ with a coupling half K and L, respectively, freely rotatable on shaft C, that only K is driven by H and L by J, but not H by K and J by L. By means of a claw coupling half $k^1$ shiftably but not rotatably arranged on the coupling half K, the latter may be rigidly connected either with a coupling half $c^2$ rigid on shaft C, or with the spur wheel J which at the same time forms a coupling half $i^2$. The coupling half L may engage corresponding coupling half $c^3$ that is shiftable but not freely rotatable on shaft C.

To engage and disengage the coupling halves $a^2$, $a^1$, $k^1$, $b^3$, $c^3$, suitable actuating devices comprising compressed air cylinders M, $M^1$, $M^2$, $M^3$, $M^4$ are provided. The couplings have sloped teeth, so that they may be thrown into gear in every position. Of course, these couplings may be replaced by couplings of other design as, e. g. friction couplings.

The gear ratios of the wheel pairs F and $c^1$, $d^1$ and H, E and J, each of which is adapted to effect the transmission of motion from shaft B to shaft C, rise in the order indicated. The connection of the shafts B and C may also be established through all the wheels in the order $d^1$, H, J, E, F, $c^1$, whereby a further, lowermost speed step is produced.

In describing the operation of the gear I shall start from the position of the individual elements, as illustrated in the drawing, in which position all claw couplings are disengaged. Firstly the coupling $a^1$, $d^2$ is thrown into gear, whereby the coupling half D of the main coupling is connected to the driving shaft A. Thereupon the motor is started. The rotation imparted by the motor to the coupling half D is transmitted by wheel $d^1$ to wheel H, but cannot be transmitted from the latter to the driven shaft C, as the coupling K $k^1$ $c^2$ is in disengaged position.

To obtain the first speed step corresponding to the gear F, $c^1$, the coupling halves $b^3$ and G mounted on shaft B are brought into engagement. Upon throwing into gear the main coupling $B^1$, D, shaft C is driven from shaft A through elements $a^1$, $d^2$, D $B^1$ B, $b^3$, G, $g^1$, E, $f^1$, F, $c^1$. As soon as the coupling halves $B^1$ and D are rotating with the same rate of revolutions, the coupling $a^2$, $b^2$ is engaged and coupling $a^1$, $d^2$ disengaged, while the main coupling $B^1$, D is again disengaged. The coupling half D and the wheels $d^1$ and H then come to rest, unless they are taken along by the bearing friction, while the wheel J rotates relatively to shaft C without load.

To perform the passage to the next higher, second speed step, the coupling $k^1$, $c^2$ is engaged so that the part K now rotates at the same speed as shaft C. Upon now throwing into gear the main coupling $B^1$, D, members D $d^1$ and H are first accelerated up to the speed of part K which rotates at the rate of shaft C. With further acceleration the free wheel coupling $h^1$ is automatically engaged. The torque of the driving shaft A is now transmitted through members $a^2$, $b^2$, $B^1$, D, $d^1$, H, $h^1$, K, $k^1$, $c^2$ to shaft C, whilst the power transmission train of the first speed step is interrupted by the free wheel coupling $f^1$ automatically disengaging itself. The shaft C thus has passed from the first to the second speed step without interruption of the power transmission. The wheel E connected to shaft B through the claw coupling $b^3$, G and through the free wheel coupling $g^1$ takes part in the rotation idling and, the same is true with respect to the wheel J freely rotatable on shaft C. As soon as the coupling halves $B^1$ and D have reached the same rate of revolutions, the coupling $a^1$, $d^2$ is engaged. The coupling $a^2$, $b^2$ and the main coupling $B^1$, D are thereupon disengaged again.

The highest, third speed step is attained by throwing into gear the coupling $c^3$, L. Upon connecting again the main coupling $B^1$, D, wheel J is first accelerated through the intermediary of the members $B^1$, B, $b^3$, G, $g^1$, E, up to the speed of the coupling half L that rotates at the rate of shaft C. Upon further acceleration the free wheel coupling $i^1$ automatically throws itself into gear. The torque of the driving shaft A is now transmitted through the members $a^1$, $d^2$, D, $B^1$, B, $b^3$, G, $g^1$, E, J, $i^1$, L, $c^3$ to the driven shaft C, whilst the power transmission train of the second speed step is interrupted by the free wheel coupling $h^1$ automatically disconnecting itself. The shaft C has thus passed from the second to the third speed step without interruption of the power transmission. The main coupling $B^1$, D now advantageously remains engaged, as the passage from a higher speed step to a lower one, which takes place also without interruption of the power transmission in the inverse order of the described connecting operations, is only possible if the main coupling is engaged. I do not describe in detail the operations to be executed in passing from a higher speed step to a lower one, as they correspond throughout to those described for raising the speed.

In throwing out of gear the main coupling $B^1$, D after the passage from one speed step to another has been accomplished, the gear members that are disconnected from the members transmitting the power are advantageously stopped by means of a brake or at least so much retarded, that no shocks will occur in the free wheel couplings during the subsequent shifting operation.

In the described embodiment the pairs of wheels that correspond to the three speed steps may further be connected in series, whereby a fourth, lowest speed step is obtained, which is required e. g. for starting heavily loaded trains or for starting trains on steep gradients. If the train should start with this lowest speed the couplings $a^2$, $b^2$ and $k^1$, $i^2$ are thrown into gear, before starting the motor, and, if required, the other couplings are thrown out of gear. Thereupon the motor is started. Coupling half D (which is still at rest) of the main coupling is then in connection with the driven shaft C through wheels $d^1$, H, free wheel coupling $h^1$, coupling K, $k^1$ $i^2$, wheels J, E, free wheel coupling $f^1$, and wheels F, $c^1$. Upon throwing-in of main coupling $B^1$, D, shaft C is driven through $a^2$, $b^2$, B, $B^1$, D, $d^1$, H, $h^1$, K, $k^1$, $i^2$, J, E, $f^1$, F, $c^1$, with the pairs of wheels $d^1$ H, J E, F connected in series and at the lowermost ratio of transmission. When, the coupling halves $B^1$ and D have reached equal speed after the connecting operation has been terminated, the coupling $a^1$, $d^2$ is thrown in whereby the half D is immediately connected to the driving shaft. Thereupon the coupling $a^2$ $b^2$ is disconnected and the main coupling $B^1$, D is thrown-out again. The shaft B then comes to rest, unless it is taken along by bearing friction.

In order to change from the fourth (lowest) speed to the next higher one, namely, that corresponding to gears F, $c^1$ which has been referred to above as "first step", shaft B is coupled with coupling half G by engaging G with coupling half $b^3$. This can be accomplished without shock because shaft B can at this time only rotate through friction and because coupling half G is eliminated from the power transmitting train by means of free wheel coupling G $g^2$. Main coupling $B^1$ D is now again actuated. The transmission of power now takes place over $a^1$, $d^2$ D, $B^1$ B $b^3$, G, $g^1$, E, $f^1$, F, $c^1$, because coupling half K is at this time driven by gears E and J at a higher speed than that at which wheel H is driven by wheel $d^1$, so that free wheel coupling $h^2$ is disengaged. In this manner the condition is again obtained which prevailed during operation with the first speed step after actuating the main coupling, as explained above, and the further operation of the change speed gear takes place as already described. The coupling $K^2 c^2$ could be left in engagement without changing anything in the operation of the device.

What I claim, is:—

1. A variable speed gear comprising driving and driven members, two alternative gear-wheel trains of different ratios of transmission having gear wheels arranged coaxially with said driving member, a free wheel coupling for said gear-wheel trains, a slip clutch common to said gear-wheel trains and arranged coaxially with said driving member, coupling means adapted to be operated at will for alternatively connecting said gear-wheel trains to said driving and driven members in cooperation with said slip clutch, and additional clutches adapted to be operated at will for coupling each of said gear-wheels to said driving member independently of the action of said slip clutch.

2. A variable speed gear comprising driving and driven members, three alternative gear-wheel trains of different ratios of transmission each train having a gear wheel arranged coaxially with said driving member, free wheel couplings for the gear-wheel trains corresponding to the two lowest speed steps, a slip clutch common to all gear-wheel trains and arranged coaxially with said driving member, coupling means adapted to be operated at will for alternatively connecting each gear-wheel train to said driving and driven members in cooperation with said slip clutch, and additional clutches adapted to be operated at will for coupling said driving member to each of said gear-wheels arranged coaxially therewith independently of the action of said slip clutch.

3. In a variable speed gear as claimed in claim 2 means allowing the gear-wheels of said gear-wheel trains to be connected in series.

4. A variable speed gear comprising driving and driven members, three alternative gear-wheel trains of different ratios of transmission having driven gear-wheels arranged in alignment and driving gear-wheels arranged coaxially with said driving member, a slip clutch common to all gear-wheel trains and arranged coaxially with said driving member, coupling means adapted to be operated at will for alternatively connecting each gear-wheel train to said driving and driven members in cooperation with said slip clutch, additional clutches adapted to be operated at will for coupling said driving member to each of said gear-wheels arranged coaxially therewith independently of the action of said slip clutch, a further clutch adapted to be operated at will for connecting in series the driven gear-wheels of the gear-wheel trains corresponding to the highest and intermediate speed steps, and free wheel couplings interposed between the single driving and driven gear-wheels, said coupling means comprising a clutch adapted to be operated at will, interposed between the slip clutch and the free wheel coupling arranged before the driving gear-wheel of the gear wheel train corresponding to the highest speed step.

The foregoing specification signed at Cologne, Germany, this 11th day of May, 1928.

WERNER JACOBS.